(12) United States Patent
Malvern et al.

(10) Patent No.: US 6,631,643 B2
(45) Date of Patent: Oct. 14, 2003

(54) ACCELEROMETER

(75) Inventors: Alan R Malvern, Plymouth (GB); Ian D Hopkin, Liskeard (GB); Kevin Townsend, Liskeard (GB); Nicolaas F Derooij, Neuchatel (CH)

(73) Assignee: BAE Systems plc, Farnborough (GB)

( * ) Notice: Subject to any disclaimer, the term of this patent is extended or adjusted under 35 U.S.C. 154(b) by 0 days.

(21) Appl. No.: 10/169,499

(22) PCT Filed: Jan. 5, 2001

(86) PCT No.: PCT/GB01/00045

§ 371 (c)(1),
(2), (4) Date: Jul. 3, 2002

(87) PCT Pub. No.: WO01/51931

PCT Pub. Date: Jul. 19, 2001

(65) Prior Publication Data

US 2003/0010123 A1 Jan. 16, 2003

(30) Foreign Application Priority Data

Jan. 13, 2000 (GB) .............................................. 0000619

(51) Int. Cl.[7] .......................................... G01P 15/125
(52) U.S. Cl. ..................................... 73/514.32; 73/518
(58) Field of Search ............................. 73/514.32, 493, 73/514.16, 514.18, 504.12, 504.14, 514.14, 514.21; 361/280, 283.1

(56) References Cited

U.S. PATENT DOCUMENTS

| | | | | |
|---|---|---|---|---|
| 4,336,718 A | 6/1982 | Washburn | ..................... | 73/497 |
| 4,663,972 A | 5/1987 | Gerard | ..................... | 73/514.21 |
| 4,872,342 A | * 10/1989 | Hanson et al. | ........... | 73/514.29 |
| 5,447,067 A | 9/1995 | Biebl et al. | ............... | 73/514.32 |
| 5,488,864 A | 2/1996 | Stephan | ................... | 73/514.32 |
| 5,581,035 A | 12/1996 | Greiff | ...................... | 73/514.32 |
| 5,734,105 A | * 3/1998 | Mizukoshi | ............... | 73/504.02 |
| 5,830,777 A | 11/1998 | Ishida et al. | .................. | 438/50 |
| 5,880,921 A | * 3/1999 | Tham et al. | ................. | 361/233 |
| 6,013,933 A | 1/2000 | Foerstner et al. | ........... | 257/415 |
| 6,055,858 A | * 5/2000 | Muenzel et al. | ......... | 73/504.12 |
| 6,232,847 B1 | * 5/2001 | Marcy et al. | ............... | 331/167 |
| 6,450,031 B1 | * 9/2002 | Sakai et al. | .............. | 73/514.16 |
| 6,536,280 B1 | * 3/2003 | Carley | ..................... | 73/504.02 |

* cited by examiner

Primary Examiner—Hezron Williams
Assistant Examiner—Jacques Saint-Surin
(74) Attorney, Agent, or Firm—Nixon & Vanderhye P.C.

(57) ABSTRACT

The accelerometer is linear having a substantially planar plate-like proof mass (9) mounted by four or more flexible mounting legs (8) each co-planar with the proof mass (9) to a substantially planar plate-like support (10) fixedly mounted relative to the proof mass (9) and co-planar therewith. In this way the proof mass (9) is mounted for linear movement in a sensing direction in the plane containing the proof mass (9), mounting legs (8) and support (10) to sense acceleration change applied to the accelerometer. At least two spaced apart substantially planar capacitor plates (11) each co-planar with the proof mass, mounting legs and support, are provided for sensing linear movement of the proof mass (9) in the sensing direction C. The proof mass (9), mounting legs (8), support (10) and capacitor blades (11) are formed from a single sheet of silicon and the mounting legs (8) extend substantially perpendicularly to the sensing direction C. Restoring means are provided for returning the proof mass (9) in the sensing direction C towards a null position.

19 Claims, 7 Drawing Sheets

ACCELEROMETER

This application is the US national phase of international application PCT/GB01/00045 filed Jan. 5, 2001, which designated the US.

This invention relates to an accelerometer and particularly to an accelerometer at which is made at least partially from silicon.

Figure 1:
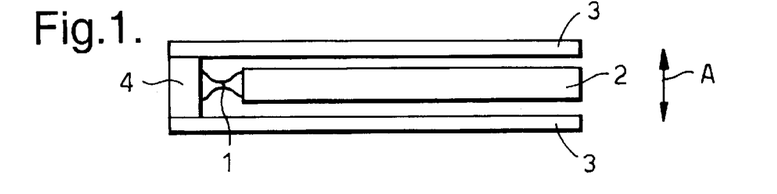
FIG. 1 is a schematic side view of a conventional pendulum silicon accelerometer not according to the present invention.

The conventional quartz and silicon accelerometers as shown in FIG. 1 of the accompanying drawings have a bulk machined (wet etched) quartz or silicon structure which is thinned along a line to create a hinge 1, with a proof mass 2, on one side thereof in the form of a pendulum. The structure is normally implemented in the form of a sandwich with two fixed capacitor plates 3, located on either side of the moveable proof mass 2 which is hinged at 1 from a support 4 on which the capacitor plates 3 are mounted. With an acceleration in the direction A in FIG. 1 which is perpendicular to the plane of the silicon or quartz wafer and proof mass 2, the proof mass is deflected arcuately about the hinge 1 by an amount proportional to acceleration. This movement is usually sensed electrostatically and a restoring force is applied to return the proof mass 2 to a null position conveniently by use of electromagnetic feedback using a wire wound coil on the proof mass. Electrostatic force may also be used for the feedback. Feedback improves the scale factor linearity at high forces as the proof mass does not move. High accuracy accelerometers are usually closed loop.

Such a conventional accelerometer can provide high accuracy over a high gravity range but is generally expensive to manufacture and of relatively large size. Additionally as the structure is a pendulous structure the motion of the proof mass 2 is arcuate which gives rise to vibro pendulosity which introduces a cross axis sensitivity under a vibration. An additional problem which is common to this and other types of conventional accelerometers is vibration rectification. This means that in the presence of a vibration but no static gravity load such a conventional accelerometer can provide an erroneous output signal which is due to an imbalance between the two capacitor plates 3 which sense the deflection of the proof mass 2 and act to give an electrostatic restoring force.

The conventional accelerometer as shown in FIG. 1 requires the two capacitor plates 3 to be operated in anti-phase with the difference in capacitance value then being linearly proportional to the offset position and acceleration. An electrostatic force is supplied for feedback. This gives rise to three particular disadvantages. Firstly the electrostatic forces are quadratic in voltage so it is necessary to linearise the force which is proportional to acceleration. This can be difficult to do for precision accelerometers. Secondly, the conventional silicon accelerometer of FIG. 1 is pendulous which means that the proof mass 2 moves in a curved arc as a function of increasing acceleration. This arcuate motion means that when the proof mass 2 is away from the null position there is a sensitivity at right angles to the main sensing axis. This effect which is generally called vibro-pendulosity is an error which is particularly apparent for vibration when it is applied to excite both axis. At high frequency of movement the proof mass is not correctly restored to the null position. Thirdly, any offset between the values of the two capacitor plates 3 which are used differentially to detect movement of the proof mass 2 away from the null position can cause the vibration rectification effect as well as bias (zero offset). Hence it is necessary accurately to match the values of the two capacitor plates 3 which is difficult to do with the sandwich structure of FIG. 1. Accordingly electronic offsets are typically used to null out any imbalance which is not desirable as any drift in this nulling signal will cause a drift in the accelerometer bias, which is a key parameter to keep stable.

Figure 2:
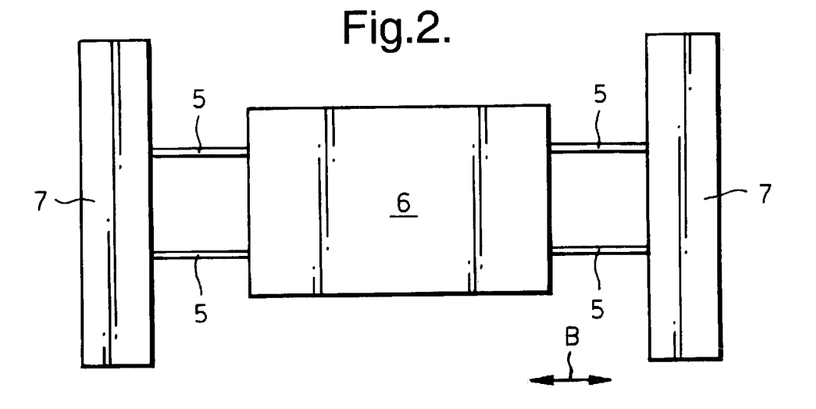
FIG. 2 is a schematic plan view from above of a conventional vibrating beam accelerometer not according to the present invention.

A second type of conventional accelerometer is shown in FIG. 2 of the accompanying drawings which uses vibrating beams 5, the frequency of vibration of which varies with strain and acceleration. The vibrating beams 5 are attached to a proof mass 6 so that the acceleratative force on the proof mass 6 changes the strain on the vibrating beams 5, either in compression or tension, to give a frequency output which varies with the gravitational force. The vibrating beams 5 generally operate differentially so that one side is in compression and the other is in tension with a frequency increase and decrease respectively of the beams. The difference frequency is then a good measure of acceleration. Movement of the proof mass is in a sensing direction B as shown in FIG. 2, with the vibrating beams 5 in effect suspending the proof mass 6 between two mounting supports 7.

The conventional accelerometer of the type shown in FIG. 2 can use quartz for the vibrating beams 5 and proof mass 6. Such accelerometers can be made smaller and slightly cheaper than the pendulum type accelerometer of FIG. 1 but they are still considerably expensive to manufacture, and are open loop accelerometers which do not usually have force feedback and which may be subject to linearity errors at high input accelerations.

There is thus a need for an improved accelerometer which utilises silicon and which at least minimises the foregoing difficulties inherent in the conventional accelerometers illustrated in FIGS. 1 and 2.

According to one aspect of the present invention there is provided an accelerometer having a substantially planar plate-like proof mass, four or more flexible mounting legs each co-planar with the proof mass, a substantially planar, ring-like support, in which the proof mass is movably mounted, which support is fixedly mounted relative to the proof mass and co-planar therewith, with each mounting leg being connected at one end to the proof mass and connected at another end to the support so that the proof mass is mounted for linear movement in a sensing direction in the plane containing the proof mass, mounting legs and support, in response to acceleration change applied to the accelerometer, and with the mounting legs extending substantially perpendicularly to the sensing direction, at least two spaced apart substantially planar capacitor plates, mounted in the ring-like support substantially transverse to the sensing direction with the proof mass located between the capacitor plates and with each capacitor plate being coplanar with the proof mass, mounting legs and support, for sensing linear movement of the proof mass in the sensing direction, a plurality of interdigitated fingers in air, comprising first arrays of laterally spaced fingers extending substantially perpendicularly to the sensing direction from the support towards the proof mass and second arrays of laterally spaced fingers extending substantially perpendicularly to the sensing direction from the proof mass towards the support, with the first arrays of fingers being interdigitated with the adjacent second arrays of fingers to provide air squeeze damping for movement of the proof mass in the sensing direction relative to the support, with the proof mass, mounting legs, support capacitor plates and interdigitated fingers are formed from a single plate of silicon, and restoring means for returning the proof mass in the sensing direction towards a null position.

Preferably the proof mass, mounting legs, support capacitor plates and interdigitated fingers are formed by dry etching from a plate of silicon which is orientated in a [111] or [100] crystal plane.

Conveniently the support has a substantially rectangular ring-like shape surrounding an inner open area in which is located the proof mass which has a substantially rectangular shape, and wherein the mounting legs extend substantially perpendicularly to the sensing direction in spaced array, with at least two between a first inner wall of the support defining the inner open area and a facing first outer wall of the proof mass and with at least two between the opposing second inner wall of the support defining the inner open area and the facing second outer wall of the proof mass.

Advantageously the mounting legs have high compliance in the sensing direction and low compliance in other directions.

Preferably the accelerometer includes a support sheet of non-conductive material on which is fixedly mounted the support and capacitor plates, with the mounting legs, proof mass and interdigitated fingers being spaced from the support sheet.

Conveniently the support sheet is made of glass to which the support and capacitor plates are fixedly mounted by anodic bonding.

Advantageously the restoring means is electromagnetic.

Preferably the proof mass carries a thin film electrically conductive coil structure, with each mounting leg carrying at least part of a turn of the coil structure.

Conveniently the capacitor plates are located in the inner open area of the support.

Advantageously the accelerometer includes an apertured glass frame located on the side of the support sheet remote from the support, and attached to the support sheet, and the restoring means includes a magnet and two bar pole pieces located in the glass frame aperture with the pole pieces being spaced apart at opposite ends of the magnet in register with the coil structure turns carried on the proof mass.

Preferably the adjacent surface of the support sheet is recessed to receive part of the bar pole pieces and a link pole piece is located on the support side of the support sheet to extend between and in registry with the two bar pole pieces.

Conveniently the accelerometer includes a sheet-like glass base attached to the glass frame on the side thereof remote from the support sheet to retain the magnet and bar pole pieces within the glass frame aperture, and a glass housing for the link pole piece.

Advantageously the magnet is poled in the sensing direction.

Preferably the first arrays of laterally spaced fingers extend substantially perpendicularly to the sensing direction from said first and second inner walls of the support towards the adjacent first and second outer walls of the proof mass and the second arrays of laterally spaced fingers extend substantially perpendicularly to the sensing direction from said first and second outer walls of the proof mass towards the adjacent first and second inner walls of the support.

Preferably the accelerometer includes at least two earth screens located within the inner open area, each between the adjacent capacitor plate and the adjacent third or fourth inner wall of the support defining the inner open area, and operable to shield the capacitor plates from the support, with the capacitor plates being electrically insulated from the earth screens and with the earth screens being electrically insulated from the support on which said earth screens are mounted.

Conveniently the drive means includes means for supplying a square wave drive voltage to the two capacitor plates in anti-phase.

Advantageously the accelerometer includes means for supplying a control current to the proof mass coil structure, which control current supply means includes a pre-amplifier for receiving from the proof mass coil structure a difference signal between the two capacitor plates at Alternating Current (AC) modulation frequency resulting from imbalance of the capacitor plates under acceleration, an AC demodulator for synchronously demodulating the output signal from the pre-amplifier, an integrator for integrating the output signal from the demodulator, a loop filter for ensuring stability of the output signal received from the integrator and a current driver for receiving the output signal from the loop filter and for feeding a control current to the proof mass coil structure.

Preferably the drive means includes means for supplying a single modulation Alternating Current (AC) to the proof mass, which gives rise to an output signal from each of the capacitor plates.

Alternatively the means for supplying a control current to the proof mass coil structure includes two pre-amplifiers, one for receiving the output signal from one of the capacitor plates and the other for receiving the output signal from the other of the capacitor plates, a differential amplifier for receiving the output signals from the two pre-amplifiers and for differencing the pre-amplifier output signals to give an output signal corresponding to the net displacement of the proof mass, and an AC demodulator for receiving the output signal from the differential amplifier and for synchronously demodulating the output signal from the differential amplifier to produce a Direct Current (DC) output signal for passage as a control current to the proof mass coil structure to return the proof mass in the sensing direction towards a null position.

For a better understanding of the present invention and to show how the same may be carried into effect, reference will now be made, by way of example, to the accompanying drawings in which.

Figure 3:
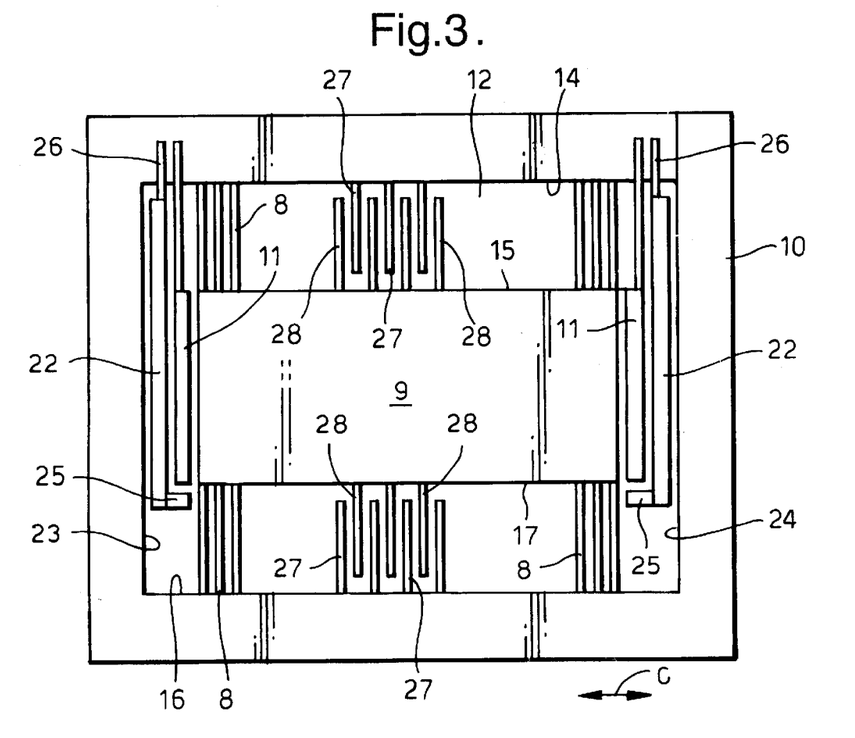
FIG. 3 is a plan view from above of part of an accelerometer according to a first embodiment of the present invention showing parts made from silicon.
Figure 4:
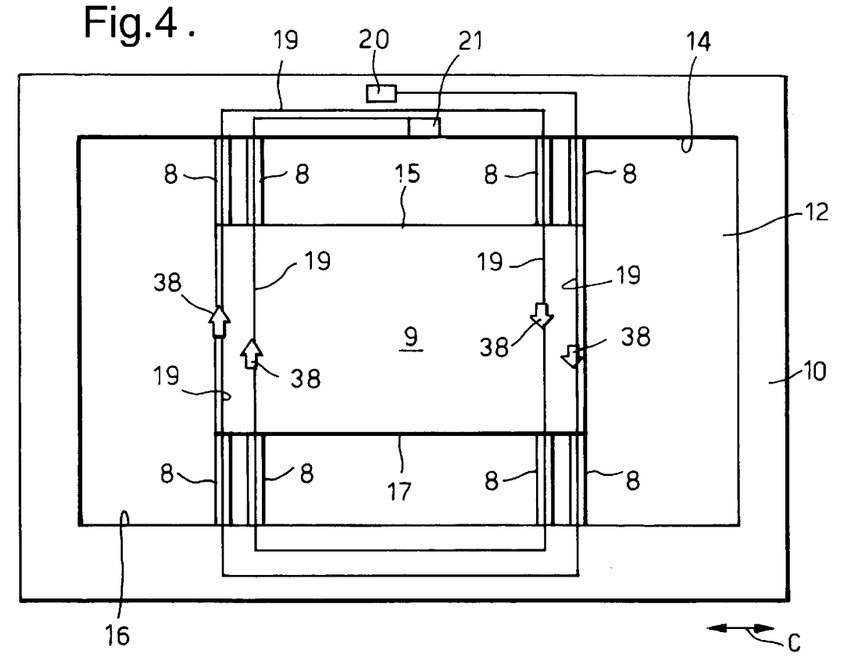
FIG. 4 is a plan view from above of part of an accelerometer according to a second embodiment of the present invention showing a coil configuration.
Figure 5:
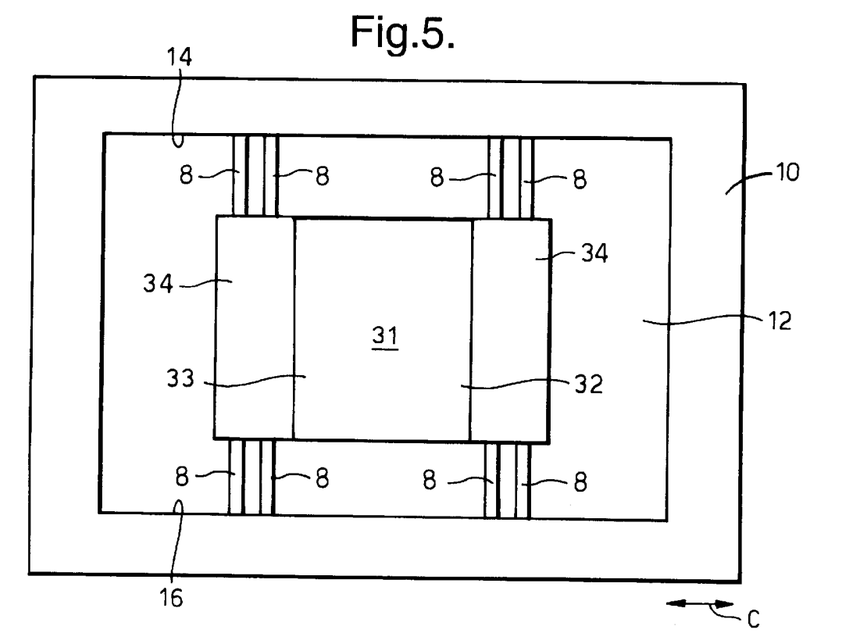
FIG. 5 is a plan view from about of a further part of the accelerometer of FIG. 4 showing a magnet assembly.
Figure 6:
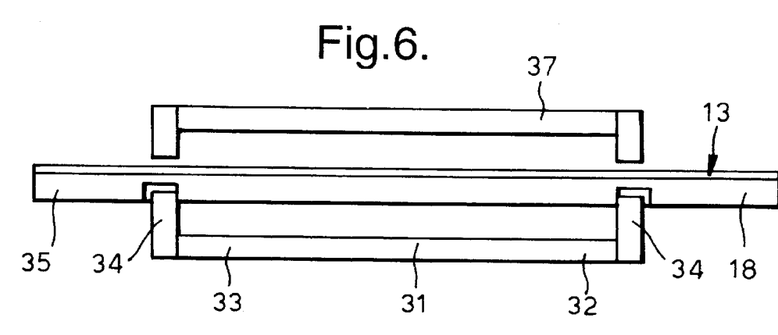
FIG. 6 is a schematic side view of the accelerometer part of FIG. 5.
Figure 11:
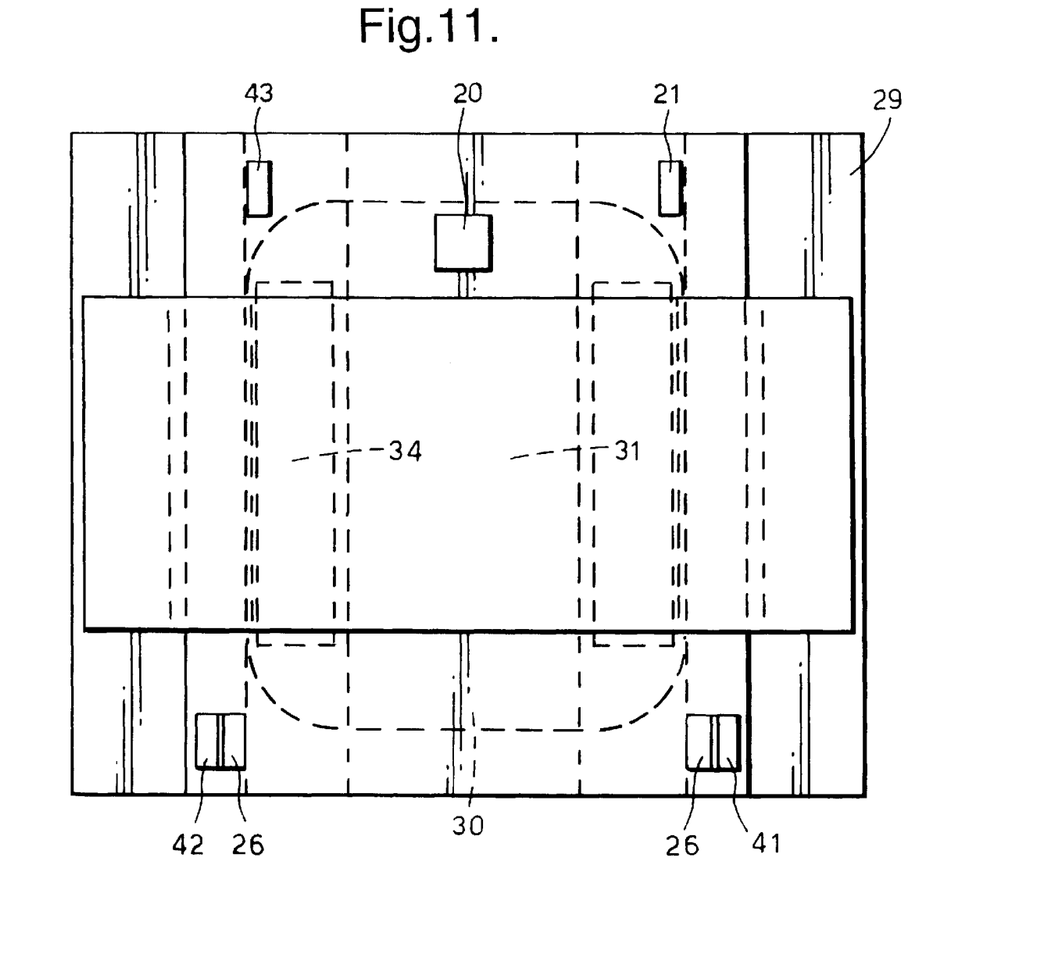
FIG. 11 is a plan view of the accelerometer of FIG. 8.
Figure 12:
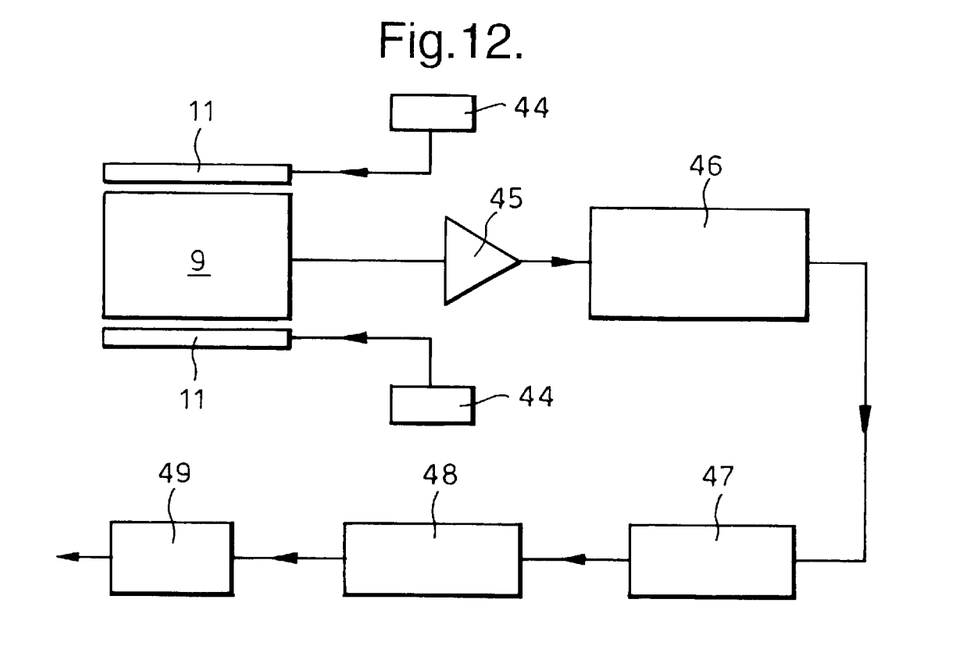
FIG. 12 is a circuit diagram of a control current supply means for the accelerometer according to the present invention.
Figure 13:
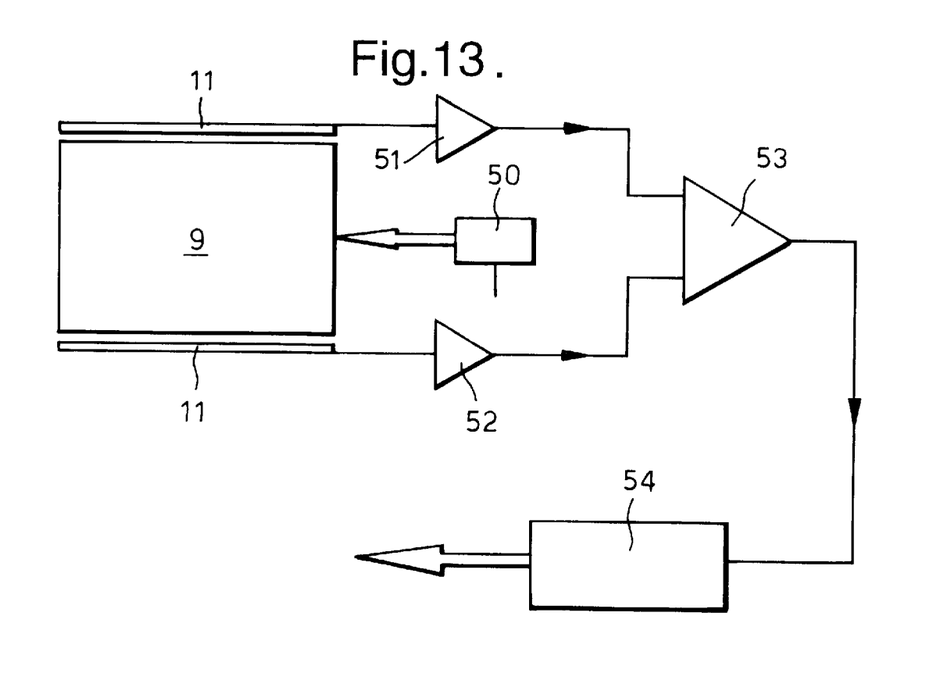
FIG. 13 is a circuit diagram of a further control current supply means for use with the accelerometer of the present invention.

An accelerometer according to the present invention as illustrated in the accompanying drawings is implemented as a silicon micro-machined accelerometer. An accelerometer according to a first embodiment of the present invention is illustrated in FIG. 3. An accelerometer according to a second embodiment of the present invention is illustrated in FIGS. 4, 5 and 6 in diagrammatic form and in more complete form in FIGS. 7 to 11. The only difference between the embodiments of FIG. 3 and of FIGS. 4 to 11 is the number of flexible mounting legs 8. In the FIG. 3 embodiment there are twelve mounting legs 8 in four groups of three and in the embodiment of FIGS. 4 to 11 there are eight mounting legs in four groups of two. However, according to the present invention there will be four or more such legs 8 present. Thus all the features from FIG. 3 with the exception of the number of mounting legs 8 and all the features from FIGS. 4 to 11 again with the exception of the numbers of mounting legs 8 are interchangeable between the two embodiments. Thus the structure of FIG. 3 is applicable to FIGS. 4 to 11 and vice versa. The control current supply means shown in FIGS. 12 and 13 are equally applicable to an accelerometer according to the present invention of any one of FIGS. 3 to 11 whatever the number of mounting legs 8 provided that the number is four or more. In all the drawings 3 to 13 like features will be given like reference numerals and if described in detail with respect to one embodiment will not be further described in detail with respect to another embodiment.

An accelerometer according to the present invention has a substantially planar plate-like proof mass 9 shown in most detail in FIG. 3 of the accompanying drawings. The proof mass 9 is illustrated in more sketchy detail in FIG. 4. A substantially planar plate-like support 10 is provided as shown in FIGS. 3, 4 and 5 which is fixedly mounted relative to the proof mass 9 and co-planar therewith as will be described later in more detail. The proof mass 9 is connected to the support 10 by four or more flexible mounting legs 8 with each mounting leg 8 being connected at one end to the proof mass 9 and connected at another end to the support 10 so that the proof mass 9 is mounted for linear movement in a sensing direction C in the plane containing the proof mass 9, mounting legs 8 and support 10 to sense acceleration change applied to the accelerometer. The sensing direction C is illustrated in FIG. 3. The mounting legs 8 extend substantially perpendicularly to this sensing direction C.

The accelerometer also includes at least two spaced apart substantially planar capacitor plates 11 shown most clearly in FIGS. 3, 12 and 13 and omitted for clarity from FIGS. 4 to 11. These capacitor plates 11 are each co-planar with the proof mass 9, mounting legs 8 and support 10 and are operative to sense linear movement of the proof mass in the sensing direction C. Additionally forming part of the accelerometer of the present invention is restoring means for returning the proof mass 9 in the sensing direction C towards a null position. The linear movement of the proof mass 9 is in the sensing direction C which is in the plane containing the proof mass 9, mounting legs 8, support 10 and capacitor plates 11.

An important feature of the accelerometer of the present invention is that the proof mass 9, mounting legs 8, support 10 and capacitor plates 11 are formed by dry etching from a single plate of silicon which is orientated in a [111] or [100] crystal plane. The co-planar construction should be contrasted with the sandwich construction of the FIG. 1 conventional accelerometer which requires all the components to be joined together. Preferably the dry etching is carried out in a deep trench etching process which provides the ability to micro-machine a complex shape. This is done to high precision in a simple process involving a single masking layer to define all the key features and is therefore straightforward to effect by micro-machining. The deep trench etching process allows the use of narrow features such as the mounting legs 8 within a deep silicon structure. Computer control is used alternatively to passivate the surface of the silicon plate with polymer such as polytetra, fluoroethylene and isotropically etch the silicon. A typical thickness of silicon is from 200 microns to 400 microns with a feature width of 10 to 20 microns which implies at least a 10:1 depth to width ratio.

The use of [111] silicon is preferred as it has an isotropic elastic constant compared to the [100] plane. This has benefits in terms of alignment. Whilst [111] silicon has a slower etch rate than [100] silicon the benefits of isotropy of the elastic constant can be more important than the etching speed. Further benefits of the use of silicon are small size and low cost due to use of wafer scale processes where many devices can be made at one time.

Alternatively the use of [100] plane silicon is possible as the motion of the proof mass 9 is rectilinear in a single plane. As long as the crystalline axis is aligned to the plane of motion then [100] plane silicon is satisfactory. The use of [100] silicon is beneficial in terms of integration with on chip electronics such as pre amplifiers.

The planar nature of the proof mass 9, mounting legs 8, support 10 and capacitor plates 11 ensures that all features of the accelerometer are manufactured at the same time thereby giving a high level of accuracy and repeatability. The use of the dry etching process with silicon wafers of typically 200 microns thickness allows a gap of 10 microns between the fixed capacitor plates 11 and the moveable proof mass 9 to be attained. The silicon is given low resistivity by being highly doped.

The support 10 has a substantially rectangular ring-like shape as shown in FIGS. 3 to 5, is typically of 10 mm by 10 mm external dimensions and surrounds an inner open area 12 typically of 6 mm by 6 mm dimensions to give a wall width of 2 mm for the support 10. The proof mass 9 which is located in the open area 12 has a substantially rectangular shape and is typically 2 mm by 2 mm in size being supported by the mounting legs 8 which are 2 mm long, 20 microns wide and 150–200 microns in thickness which is the thickness of the silicon wafer schematically illustrated at 13 in FIG. 7, from which the proof mass 9, support 10, mounting legs 8 and compacitor plates 11 are formed. The mounting legs 8 have a high compliance in the sensing direction C and low compliance in other directions so that other modes of movement have a significantly higher resonance frequency. As aforesaid FIG. 3 shows twelve mounting legs whilst FIGS. 4 and 5 show the use of eight mounting legs 8. The minimum number of mounting legs feasible is four which are located one at each corner of the proof mass 9. The proof mass 9 supported by the flexible mounting legs 8 preferably has a resonance frequency in the range of from 1 to 2 kHz, preferably 1 kHz. Increasing the number of mounting legs 8 requires the width of each mounting leg to be reduced. In practice a number of mounting legs 8 higher than forty eight implies a thinner width of leg to achieve the same resonance frequency which in turn defines the sensitivity of the accelerometer, which thinner width is then difficult to control.

As shown in FIGS. 3 and 4 the proof mass 9 and mounting legs 8 are located in the inner open area 12. The mounting legs 8 extend substantially perpendicularly to the sensing direction C with at least two between a first inner wall 14 of the support 10 defining the inner open area 12 and a facing first outer wall 15 of the proof mass 9 and with at least two between the opposing second inner wall 16 of the support 10 defining the inner open area 12 and the facing second outer wall 17 of the proof mass 9.

The rectangular form of the proof mass 9 leads to improved de-coupling of external stresses. As the accelerometer works down to DC strain, which in other words is acceleration, it is very sensitive to any strain that can deflect the proof mass. Examples include mounting strain due to the fixing means and thermal gradients across the silicon. Mounting of the proof mass 9 by means of the external surrounding support 10 reduces the strain that can come onto the proof mass 9 and thereby improves the bias accuracy of the accelerometer.

The accelerometer of the present invention also includes a support sheet 18, made of non-conductive material on which is fixedly mounted the support 10 and capacitor plates 11. Preferably the support sheet 18 is made of glass to which the support 10 and capacitor plates 11 are fixedly mounted by anodic bonding with the mounting legs 8 and proof mass 9 being spaced from the support sheet 18. The underside of the silicon wafer 13 forming the proof mass 9, mounting legs 7 is undercut by typically 10 to 15 microns again by deep trench etching. Suitable glasses for the support sheet 18 are PYREX™ which is a Corning type 7740 glass or HOYA™ SD-2. These glasses substantially match the expansion rate of the silicon and thus avoid differential strain between the silicon wafer 13 and the support sheet 18. The support sheet 18 may be bonded to a ceramic substrate (not shown) within a hybrid package which can be hermetically sealed. In this way the accelerometer can be provided with a metal sealing can which is useful to give magnetic screening and to allow for electrical connections.

The restoring means of the accelerometer according to the present invention is electromagnetic. To this end the proof mass 9 carries a thin film electrically conductive coil structure made up of turns 19 as shown in FIG. 4. For convenience the coil structure turns 19 have not been shown in FIG. 3 and FIGS. 5 to 13 but they are present in exactly the same format as in FIG. 4. As can be seen from FIG. 4 each mounting leg 8 carries at least part of a turn 19 of the coil structure. This is the same for FIGS. 3 and 5 to 13. The more turns of the coil structure the smaller the current required to restore the proof mass position to the null position. Of course the more turns the coil structure are present with increased numbers of mounting legs 8. Preferably the accelerometer has forty-eight legs 8 to give the best feedback scale factor by having as many coil turns 19 as is feasible. Conveniently the coil structure starts at 20 which is a start bond pad on the support 10 and finishes at 21 which is the end bond pad on the support 10. The bond pads 20, 21 are shown sketchily in FIGS. 7 and 11 in a slightly different position.

The coil structure conveniently is formed from a thin film of metal which is deposited directly onto the silicon wafer 13 over an area thereof which forms the proof mass 9. Typically the silicon is coated with a thin film of oxide for insulation. The metal is then patterned by photolithography and deposited onto the oxide. Typically a three micron thickness of aluminium alloy is used to give a low resistance. If a total of forty eight mounting legs 8 are provided in four groups of twelve then the mounting legs are approximately 15 microns wide with the metal tracking forming the coil turn 19 deposited on each leg being about ten microns wide. On the support 10 and on the proof mass 9 the width of the metal forming the coil turn 19 is increased to 100 microns to reduce the overall coil resistance. For a coil structure having twelve turns 19 as would be the case with the accelerometer illustrated in FIG. 3 which has twelve mounting legs 8 having a coil structure with an overall dimension of 11 mm by 7 mm on the support 10 and mounting legs 8 of 2 mm length the resistance is less than 200 ohms. This means that for typical accelerometers operating over a small 20g range the scale factor is mA/g giving a maximum current requirement of 40 mA leading to the requirement of 8 volts of supply current with a dissipation of 80 milliwatts under a steady 20 g load.

The metal coil turn 19 on each mounting leg 8 is mounted at the centre of the leg, that is on the neutral axis with respect to the deflection in the sensing direction C. This can be achieved to an accuracy given by the photolithography technique. This has the advantage that if there is any creep or long term change in the metal of the turn 19 on each leg there will be no strain on the proof mass 9 so that there will be no net deflection of the legs 8 and thereby of the proof mass 9 which would be seen as a bias shift. Preferably the same mask is used for the metal deposition and for the deep trench etching which defines the legs 8.

In the accelerometer according to the present invention the capacitor plates 11 are located in the inner open area 12 of the support 10 one on one side of the proof mass 9 and the other on the opposite side of the proof mass 9 and extend substantially transverse to the sensing direction C. For convenience the capacitor plates 11 have been shown in FIG. 3, sketchily in FIG. 10 and in FIGS. 12 and 13 but not in the remaining FIGS. 4 to 9 and 11. The two capacitor plates 11 are made at the same time with the same process and from the same silicon. This gives a good chance of achieving a very high accuracy of balancing of the two capacitor plate values which is important to eliminate vibration rectification. This latter effect causes a DC accelerometer output in the presence of an in plane vibration and is eliminated when the two capacitor values are accurately matched. The balance of the capacitance values achievable can be better than 1% which is important to reduce vibration rectification. The use of a support 10 with the mounting legs roughly located at the four corner areas of the proof mass 9 means that the proof mass is very stiff in relation to motion orthogonal to the sensing direction C and in plane. This additionally leads to very low cross axis sensitivity in the sensing direction C.

Cross axis sensitivity is additionally kept low by the use of the thick (typically 150 microns) silicon wafer 13 compared to the relatively thin mounting legs 8 in the sensing direction C. Out of plane motion of the proof mass 9 will not cause a differential capacitance when the values of the two capacitor plates 11 are well matched. The out of plane motion is at least a factor of ten smaller than the in plane motion along the sensing direction C and with balancing of the two capacitor values to within 1% the out of plane sensitivity is less than 0.1% of the in plane sensitivity which is good for an accelerometer.

The accelerometer includes at least two earth screens 22 located within the inner open area 12 with each being between the adjacent capacitor plate 11 and the adjacent third inner wall 23 or fourth inner wall 24 of the support 10 defining the inner open area 12 as can be seen from FIG. 3. The earth screens 22 are operable to shield the capacitor plates 11 from the support 10. To this end each earth screen 22 may have a turned over end 25 to cover the free ends of the capacitor plates 11. The capacitor plates 11 are electrically insulated from the earth screens 22 with the earth screens 22 being electrically insulated from the support 10 on which they are mounted at bond pads 26 shown in FIG. 3 and in FIGS. 7, 8 and 11. As can be seen from FIG. 3 there is a gap, preferably of 10 microns, surrounding each earth screen 22 so that the capacitor plates are electrically insulated from the earth and the earth is electrically insulated from the remaining silicon of the wafer 13. The use of such earth screens 22 means that the high voltage on the capacitor plates 11 does not reach the rest of the silicon of the support 10.

The accelerometer of the present invention also includes a plurality of inter-digitated fingers in air comprising a first array 27 of laterally spaced fingers extending substantially perpendicularly to the sensing direction C from the first and second inner walls 14 and 16 of the support 10 towards the adjacent first and second outer walls 15, 17 of the proof mass 9 and a second array 28 of laterally spaced fingers extending substantially perpendicularly to the sensing direction C from the first and second outer walls 15, 17 of the proof mass 9 towards the adjacent first and second inner walls 14, 16 of the support 10. The first arrays 27 of fingers are inter-digitated with the adjacent second arrays 28 of fingers as can be seen from FIG. 3 to provide air squeeze damping for movement of the proof mass in 9 in the sensing direction C relative to the support 10. In operation the second array 28 of fingers being attached to the proof mass 9 move with the proof mass relative to the first array 27 of fingers which are fixedly attached to the support 10 which is fixed so that the air between the inter-digitated fingers is compressed on linear movement of the proof mass in the sensing direction C. This gives rise to damping of the proof mass 9. The width of the fingers in each of the arrays 27, 28 preferably is 10 microns and the gap between the fingers in the null position of the proof mass 9 is about 10 microns. The air between the interdigitated fingers may be at atmospheric pressure or at any other reduced or elevated pressure.

In a vacuum the proof mass 9 will have a resonant frequency (usually set between 1 and 2 kHz) with a high quality factor Q which may be in the range of from 1,000 to 10,000. The presence of this high Q resonance can have a deleterious effect on performance of the accelerometer and may cause the accelerometer to break under shock conditions even when switched off. By having atmospheric pressure between the inter-digitated fingers and a suitable number of fingers on both sides of the proof mass 9 with respect to the sensing direction C it is possible critically to damp the resonance so that the Q factor is less than 1. This implies that under shock conditions damage is unlikely to occur. The fingers of the two arrays 27, 28 preferably are formed by dry etching, such as using the deep trench etching technique, from the silicon wafer 13 so that they are co-planar with the mounting legs 8, proof mass 9, support 10 and, capacitor plates 27, 28 are spaced from the support sheet 18.

As shown in FIGS. 7 to 11 an accelerometer according to the present invention preferably includes an apertured glass frame 29, having an aperture 30. The frame 29 is located on the side of the support sheet 18 remote from the support 10 and attached to the support sheet 18 in any convenient manner such as being bonded together using an epoxy adhesive with a thin bond line such as Epotek 360™ with a high glass transition temperature.

The restoring means of the accelerometer of the present invention includes a magnet 31 which preferably is a samarium cobalt magnet. This magnet 31 is poled along the sensing direction C to have for example, a South pole at one end 32 and a North pole at the other end 33.

Also forming part of the restoring means are two bar pole pieces 34 located in the glass frame aperture 30 with the pole pieces 34 being spaced apart at opposite ends of the magnet 31 in register with the coil structure turns 19 carried on the proof mass 9. A current flowing through these turns 19 gives rise to a restoring force opposing the direction of movement of the proof mass 9 under acceleration to return the proof mass 9 to a null position. The use of a samarium cobalt for the magnet 31 has the benefits of providing high coercivity, high remnance, high Curie temperature and good long term stability.

Figure 7:
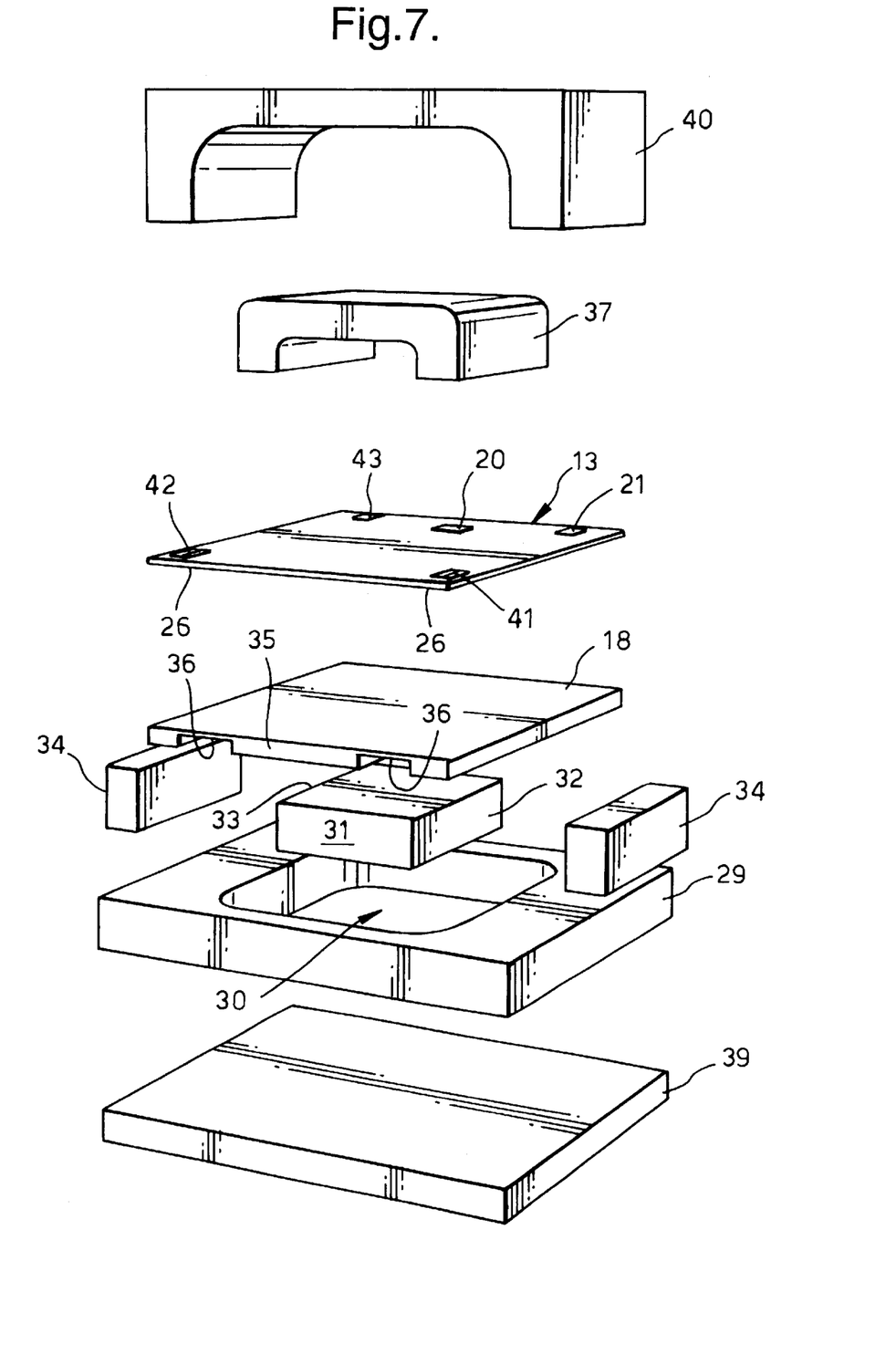
FIG. 7 is an exploded perspective view of the accelerometer of FIGS. 3–6.
Figure 8:
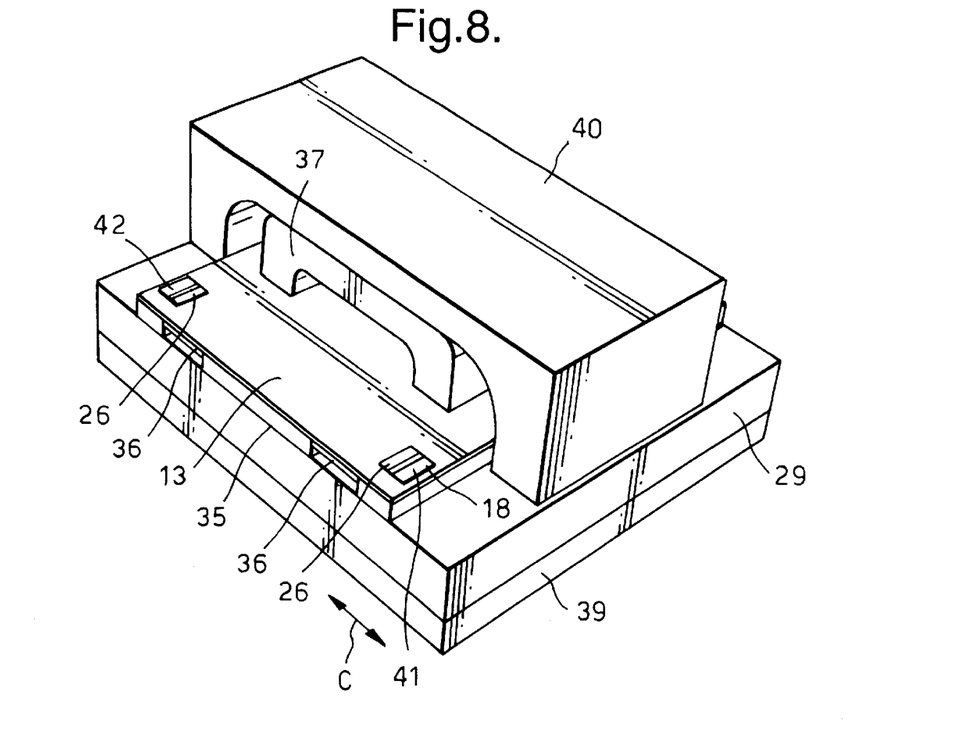
FIG. 8 is an assembled perspective view of the accelerometer of FIG. 7.
Figure 9:
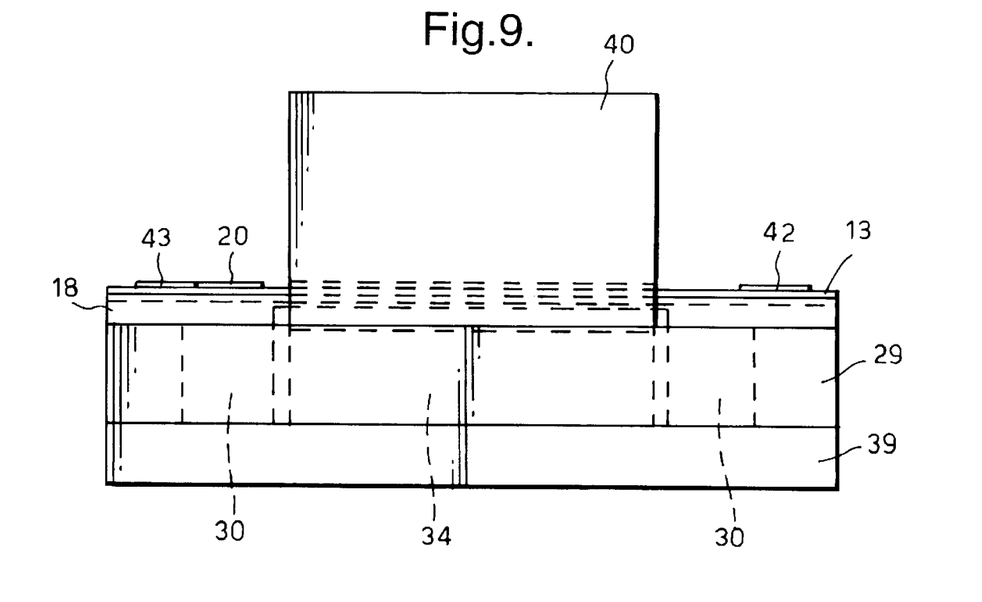
FIG. 9 is an end view of the accelerometer of FIG. 8.
Figure 10:
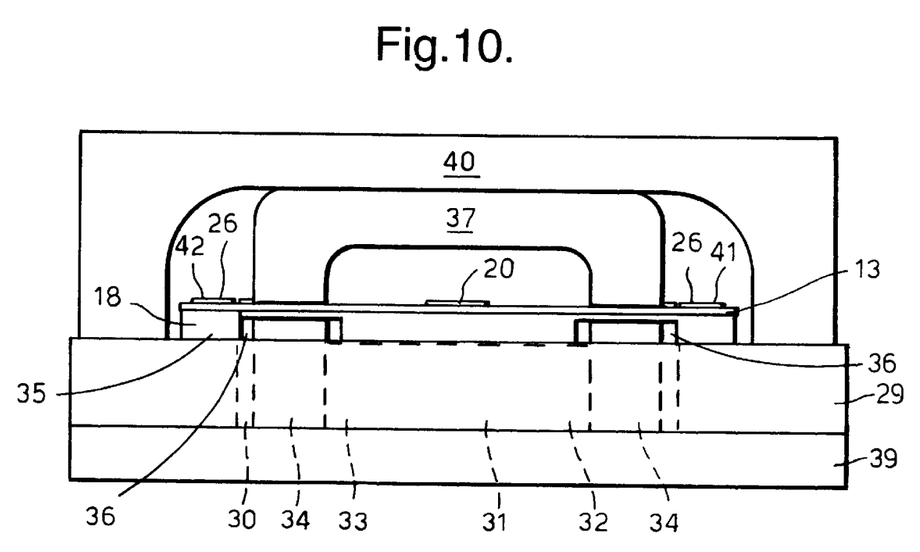
FIG. 10 is a front view of the accelerometer of FIG. 8.

The adjacent surface 35 of the support sheet 18 is recessed at 36 to receive part of the bar pole pieces 34 as shown particularly in FIGS. 7, 8 and 10. A link piece 37 is provided located on the support side of the support sheet 18 to extend between and in registry with the two bar pole pieces 34. These bar pole pieces 34 at the ends of the magnet 31 and the link piece 37 give a strong magnetic field normal to the plane of the silicon wafer 13 in a gap which is typically 400 microns. The recesses 36 in the support sheet 18 which at least partially house the bar pole pieces 34 assist the achieving of this 400 microns gap. The coil structure turns 19 on the proof mass 9 contribute to the overall deflection as the magnetic field is in opposition from the one end to the other of the proof mass 9 and the sense of the current in the coil turns 19 as shown by the arrows 38 in FIG. 4 is also opposed, so that the Lorentz force is in the same direction for the two sides of the coil turns 19 on the proof mass 9. This improves the scale factor (mA/g).

Conveniently the accelerometer includes a sheet-like glass base 39 made of any convenient material such as PYREX™ attached to the glass frame 29 on the side thereof remote from the support sheet 18 to retain the magnet 31 and bar pole pieces 34 within the glass frame aperture 30. Additionally a glass housing 40 is provided for housing the link pole piece 37. Thus the magnet 31 is encapsulated in glass which prevents any particles being attracted to it in the service life of the accelerometer.

Preferably the link pole piece 37 is glued to the glass housing 40, which gives good mechanical thermal stability. The glass housing 40 is attached to the glass frame 29 which in turn is attached to the glass base 39. All these parts are glued together using an epoxy adhesive with a thin bond such as Epotek 360™ with a high glass transition temperature. The upper surface of the silicon wafer 13 therefore does not have anything glued to it directly so as to reduce thermally induced strain. As illustrated in FIGS. 7, 8 and 11 connections are provided on the silicon support 10 at 20 and 21 for the two ends of the coil structure turns 19. Also provided on the support 10 are the earth bond pads 26. Additionally one capacitor plate 11 is connected to a bond pad 41 on the support 10 and the other capacitor plate 11 is connected to a bond pad 42 on the conductor 10. The proof mass 9 is connected to a bond pad 43 on the support 9 to provide a connection for the output signal from the proof mass 9.

In the embodiments of FIGS. 3 to 11 the coil structures turns 19 one the proof mass 9 carry a feedback current as previously described. The magnetic field formed between the bar pole pieces 34 and the link pole pieces 37 provide a lateral force to counter the acceleration of force along the sensing direction C when a current flows through the coil structure 19 as shown by the arrows 38 in FIG. 4. The current flowing through the coil structure turns 19 is proportional to the acceleration when the electromagnetic force equals the applied acceleration and the proof mass 9 is returned to its equilibrium or null position.

The accelerometer according to the present invention includes means for supplying a square wave drive voltage to the two capacitor plates 11 in anti-phase. This may be done in accordance with the means of FIG. 12 or the means of FIG. 13. When a square wave drive voltage is applied to the two capacitor plates via the two anti-phase Alternating Current drives 44 an electric field is set up between the two plates 11 as the silicon used for the capacitor plates and for the proof mass 9 is slightly conducting. The pick up from the proof mass 9 is taken off at the bond pad 43. The silicon from the support 10, proof mass 9 and capacitor plates 11 is electrically isolated by virtue of being mounted on the highly insulating glass of the support sheet 18.

Means are provided for supplying a control current to the proof mass coil structure turns 19 which control current supply means includes a preamplifier 45 for receiving from the proof mass coil structure turns 19 a differential signal between the two capacitor plates at alternating current (AC) modulation frequency resulting from imbalance of the capacitor plates 11 under acceleration. Thus acceleration in the sensing direction C causes linear movement of the proof mass 9 which in turn causes an imbalance of the two capacitor plates 11. This imbalance is sensed as an error signal which is the differential signal. To cancel the fixed offset of the capacitor plates in the absence of acceleration a fixed differential drive level is applied. As the offset of the capacitor plates may vary from device to device calibration may be necessary. Thus the closed loop has no input error so there is no need for an electrical offset for the closed loop with a consequent drifts of electrical offset that may arise. Resister chains may be used to set the relative levels of drive of the two capacitor plates 11 so that it is possible accurately to set up a precision ratio of the values of the two capacitor plates 11.

Thus the use of anti-phase signals on the two capacitor plates 11 means that there is only a single signal emerging from the proof mass 9 which can be amplified to act as the error signal for the closed loop operation. To this end the AC modulation applied to the two capacitor plates 11 is synchronously demodulated by an AC demodulator 46 which demodulates the output signal from the preamplifier 45. An integrator 47 is provided for integrating the output signal from the demodulator 46 and a loop filter 48 is provided for ensuring stability of the output signal received from the integrator 47. The loop filter 48 preferably is a low pass filter. A current drive 49 is provided for receiving the output signal from the loop filter 48 and for feeding a control current to the proof mass coil structure turns 19.

In the control current supply means of FIG. 12 the AC drives to the two capacitor plates 11 from the drive voltage supply means 44 are in anti-phase but are set to a different level in any convenient manner such as by a potentiometer chain. The difference in drive voltage is set so that in the absence of acceleration on the accelerometer there is no output from the capacitor plates. In effect what is being carried out is that any potential imbalance between the two capacitor plates 11 is taken out by putting an offset on the drive to the proof mass 9 without introducing a bias which may be subject to variation. By applying differential voltages to the two capacitor plates 11 the problems of pick off of the output signal are minimised as the differential voltages give rise to a low voltage on the proof mass 9. As there is a single pick off pre-amplifier 45 there is no problem of relative stability as could be the case if two pre-amplifiers were used.

Alternatively to the control current supply means of FIG. 12 control current supply means as shown in FIG. 13 may be employed. In the arrangement of FIG. 13 a single modulation to the proof mass 9 is employed which gives rise to two signals from the two capacitor plates 11 which are then differenced to give the net displacement. The single modulation alternating current is supplied to the proof mass 9 from an AC current supply 50. The output signals from the capacitor plates 11 are supplied one to one pre-amplifier 51 and the other to a second pre-amplifier 52. The output signal from the two pre-amplifiers 51, 52 are passed to a differential amplifier 53 which operates to difference the pre-amplifier output signals to give an output signal corresponding to the net displacement of the proof mass 9. The output signal from the differential amplifier 53 is passed to a AC demodulator 54 which synchronously demodulates the output signal from the differential amplifier 53 to produce a Direct Current (DC) output signal for passage as a control current to the proof mass coil structured turns 19.

As the capacitor plates 11 are anodically bonded to the glass support sheet 18 the capacitor plates are well electrically isolated with respect to ground in operation. The square wave voltages applied in anti-phase to the two capacitor plates are large, typically + or −10 volts at an arbitrary frequency which preferably is 14,000 Hz. Thus any imbalance in position of the proof mass 9 due to acceleration will cause a small voltage to appear on the proof mass which voltage is proportionate to acceleration. Due to the high conductivity of the silicon, set by a high doping level, this voltage will then appear on the support 10. The bond pad 43 is attached to the silicon of the wafer 13 by cutting through the oxide layer and this forms the output for further electronic processing. To obtain the maximum signal to obtain at the pre-amplifier 45 it is important that this output signal does not leak to ground by a shunt stray capacitance and the use of anodically bonded glass to the silicon gives the lowest stray capacitance production.

The planar construction of the accelerator of the present invention provides high accuracy of fabrication which makes it possible accurately to match the values of the two capacitor plates. Although these are operated as a differential pair in anti-phase it is still important that they are carefully matched in value to reduce the bias of the accelerometer. The matching of the value of the capacitor plates assists in minimising vibration rectification errors. In the accelerometer of the present invention the acceleration of the proof mass 9 is linear under acceleration. This ensures that there is fundamentally no vibro-pendulous error as the centre of mass and the centre of suspension of the proof mass reside at the same point so that the open loop movement is linear rather than arcuate as is the case with pendulous construction accelerometers such as that described and illustrated in respect of FIG. 1 of the accompanying drawings. In order to reduce sensitivity of the accelerometer of the present invention to static accelerations and strains, it is desirable to de-couple the proof mass 9 and capacitor plates 11 as much as possible from strain which is best accomplished by matching the expansion coefficients of the silicon from which the proof mass 9, support 10 and mounting legs 8 are made and the glass from which the support sheet 18 is made.

The use of electromagnetic forcing gives a highly linear relationship between the drive current in the coil structure turns 19 and the applied accelerative force. The linear force acting on the proof mass 9 is proportional to the current in the coil structure turns 19 in the uniform magnetic field. Thus the output of the accelerometer is a current and this output signal can easily be transmitted without attenuation or degradation of accuracy which is not the case with a voltage which would be subject to thermoelectric effects.

The use of anodic bonding between the capacitor plates 11, support 10 and support sheet 18 which are made of glass gives good electrical isolation of the capacitor plates with respect to earth. The use of glass for the support sheet 18 with an expansion coefficient close to that of silicon ensures that differential temperatures do not effect the differential capacitance across the silicon of the proof mass 9, capacitor plates 11 and support 10. Additionally the capacitor plates 11 act to provide an air squeeze film which also acts in part to damp the resonance of the sprung proof mass 9. This protects the accelerometer from shock when it is not under power and working. As it is possible resistively to couple the capacitor plates 11 to earth there are not static charges built up which could also give rise to errors.

What is claimed is:

1. An accelerometer having
a substantially planar plate-like proof mass,
four or more flexible mounting legs each co-planar with the proof mass,
a substantially planar, ring-like support, in which the proof mass is movably mounted, which support is fixedly mounted relative to the proof mass and co-planar therewith,
with each mounting leg being connected at one end to the proof mass and connected at another end to the support so that the proof mass is mounted for linear movement in a sensing direction in the plane containing the proof mass, mounting legs and support, in response to acceleration change applied to the accelerometer, and with the mounting legs extending substantially perpendicularly to the sensing direction,
at least two spaced apart substantially planar capacitor plates, mounted in the ring-like support substantially transverse to the sensing direction with the proof mass located between the capacitor plates and with each capacitor plate being co-planar with the proof mass, mounting legs and support, for sensing linear movement of the proof mass in the sensing direction, a plurality of inter-digitated fingers in air, comprising first arrays of laterally spaced fingers extending substantially perpendicularly to the sensing direction from the support towards the proof mass and second arrays of laterally spaced fingers extending substantially perpendicularly to the sensing direction from the proof mass towards the support, with the first arrays of fingers being interdigitated with the adjacent second arrays of fingers to provide air squeeze damping for movement of the proof mass in the sensing direction relative to the support, with the proof mass, mounting legs, support capacitor plates and inter-digitated fingers are formed from a single plate of silicon, and
restoring means for returning the proof mass in the sensing direction towards a null position.

2. An accelerometer according to claim 1, wherein the proof mass, mounting legs, support capacitor plates and interdigitated fingers are formed by dry etching from a plate of silicon which is oriented in [111] or [100] crystal plane.

3. An accelerometer according to claim 1, wherein the support has a substantially rectangular ring-like shape surrounding an inner open area in which is located the proof mass which has a substantially rectangular shape, and wherein the mounting legs extend substantially perpendicularly to the sensing direction in spaced array, with at least two between the first inner wall of the support defining the inner open area and a facing first outer wall of the proof mass and with at least two between the opposing second inner wall of the support defining the inner open area and the facing second outer wall of the proof mass.

4. An accelerometer according to claim 3, wherein the mounting legs have high compliance in the sensing direction and low compliance in other directions.

5. An accelerometer according to claim 4, including a support sheet of non-conductive material on which is fixedly mounted the support and capacitor plates, with the mounting legs, proof mass and inter-digitated fingers being spaced from the support sheet.

6. An accelerometer according to claim 5, wherein the support sheet is made of glass to which the support and capacitor plates are fixedly mounted by anodic bonding.

7. An accelerometer according to claim 6, wherein the restoring means is electro-magnetic.

8. An accelerometer according to claim 7, wherein the proof mass carries a thin film electrically conductive coil structure, with each mounting leg carrying at least part of a turn of the coil structure.

9. An accelerometer according to claim 8, including an apertured glass frame located on the side of the support sheet remote from the support and attached to the support sheet, and wherein the restoring means includes a magnet and two bar pole pieces located in the glass frame aperture with the pole pieces being spaced apart at opposite ends of the magnet in register with the coil structure turns carried on the proof mass.

10. An accelerometer according to claim 9, wherein the adjacent surface of the support sheet is recessed to receive part of the bar pole pieces and including a link pole piece located on the support side of the support sheet to extend between and in registry with the two bar pole pieces.

11. An accelerometer according to claim 10, including a sheet-like glass base attached to the glass frame on the side thereof remote from the support sheet to retain the magnet and bar pole pieces within the glass frame aperture, and a glass housing for the link pole piece.

12. An accelerometer according to claim 11, wherein the magnet is poled in the sensing direction.

13. An accelerometer according to claim 3, wherein the capacitor plates are located in the inner open area of the support.

14. An accelerometer according to claim 3, wherein first arrays of laterally spaced fingers extend substantially perpendicularly to the sensing direction from said first and second inner walls of the support towards the adjacent first and second outer walls of the proof mass and the second arrays of laterally spaced fingers extend substantially perpendicularly to the sensing direction from said first and second outer walls of the proof mass towards the adjacent first and second inner walls of the support.

15. An accelerometer according to claim 3, including at least two earth screens located within the inner open area each between the adjacent capacitor plate and the adjacent third or fourth inner wall of the support defining the inner open area, and operable to shield the capacitor plates from the support, with the capacitor plates being electrically insulated from the earth screens and with the earth screens being electrically insulated from the support on which said earth screens are mounted.

16. An accelerometer according to claim 1, including means for supplying a square wave drive voltage to the two capacitor plates in anti-phase.

17. An accelerometer according to claim 16, including means for supplying a control current to the proof mass coil structure, which control current supply means includes a pre-amplifier for receiving from the proof mass coil structure a difference signal between the two capacitor plates at Alternating Current (AC) modulation frequency resulting from imbalance of the capacitor plates under acceleration, an AC demodulator for synchronously demodulating the output signal from the pre-amplifier, an integrator for integrating the output signal from the demodulator, a loop filter for ensuring stability of the output signal received from the integrator and a current driver for receiving the output signal from the loop filter and for feeding a control current to the proof mass coil structure.

18. An accelerometer according to claim 1, wherein the drive means includes means for supplying a single modulation Alternating Current (AC) to the proof mass, which gives rise to an output signal to each of the capacitor plates.

19. An accelerometer according to claim 18, including means for supplying a control current to the proof mass coil structure, which control current supply means includes two pre-amplifiers, one for receiving the output signal from one of the capacitor plates and the other for receiving the output signal from the other of the capacitor plates, a differential amplifier for receiving the output signals from the two pre-amplifiers and for differencing the pre-amplifier output signals to give an output signal corresponding to the net displacement of the proof mass, and an AC demodulator for receiving the output signal from the differential amplifier and for synchronously demodulating the output signal from the differential amplifier to produce a Direct Current (DC) output signal for passage as a control current to the proof mass coil structure to return the proof mass in the sensing direction towards a null position.

* * * * *